US 11,265,110 B2

(12) United States Patent
Bai et al.

(10) Patent No.: US 11,265,110 B2
(45) Date of Patent: Mar. 1, 2022

(54) ADAPTIVE HYBRID AUTOMATIC REPEAT REQUEST (HARQ) COMMUNICATION

(71) Applicant: QUALCOMM Incorporated, San Diego, CA (US)

(72) Inventors: Tianyang Bai, Bridgewater, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 16/878,322

(22) Filed: May 19, 2020

(65) Prior Publication Data
US 2021/0006355 A1    Jan. 7, 2021

Related U.S. Application Data

(60) Provisional application No. 62/869,334, filed on Jul. 1, 2019.

(51) Int. Cl.
*H04L 1/08*    (2006.01)
*H04L 1/18*    (2006.01)

(52) U.S. Cl.
CPC . *H04L 1/08* (2013.01); *H04L 1/18* (2013.01)

(58) Field of Classification Search
CPC ... H04L 5/0055; H04L 1/0026; H04L 1/1812; H04L 1/08; H04L 69/40; H04L 1/00; H04L 1/0001; H04L 1/18; H04L 1/1858; H04L 5/0057
See application file for complete search history.

(56) References Cited

U.S. PATENT DOCUMENTS

2013/0039292 A1* 2/2013 Liu .................. H04W 72/04
370/329
2014/0038605 A1* 2/2014 Behnamfar ....... H04W 36/0061
455/436

(Continued)

FOREIGN PATENT DOCUMENTS

EP          3681224 A1    7/2020
WO      2019049938 A1    3/2019

OTHER PUBLICATIONS

International Search Report and Written Opinion—PCT/US2020/033811—ISAEPO—dated Aug. 26, 2020.

*Primary Examiner* — Khanh C Tran
(74) *Attorney, Agent, or Firm* — Patterson & Sheridan, LLP

(57) ABSTRACT

Certain aspects of the present disclosure provide systems and methods for adaptive hybrid automatic repeat request (HARQ) communication for changing a reference signal (RS) configuration between one or more re-transmissions. In some embodiments, the method includes detecting a failure to decode a first communication from a network entity. The method may also include determining one or more communication metrics associated with the first communication. The method may also include selecting a physical parameter configured to identify the one or more communication metrics associated with the first communication, and transmitting a second communication in accordance with the selected physical parameter to the network entity in response to detecting the failure to decode the first communication.

27 Claims, 10 Drawing Sheets

(56) References Cited

U.S. PATENT DOCUMENTS

| | | | |
|---|---|---|---|
| 2014/0038616 A1* | 2/2014 | Burbidge | H04W 36/0079 |
| | | | 455/442 |
| 2015/0215903 A1* | 7/2015 | Zhao | H04W 72/02 |
| | | | 370/329 |
| 2018/0199359 A1* | 7/2018 | Cao | H04L 5/0012 |
| 2019/0261191 A1* | 8/2019 | Nakano | H04W 16/26 |
| 2020/0260470 A1* | 8/2020 | Awad | H04W 72/042 |

* cited by examiner

ADAPTIVE HYBRID AUTOMATIC REPEAT REQUEST (HARQ) COMMUNICATION

CROSS-REFERENCE TO RELATED APPLICATION(S)

This application claims benefit of and priority to U.S. Provisional Application No. 62/869,334, filed Jul. 1, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for adaptive hybrid automatic repeat request (HARQ) communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network, Certain aspects provide a first method for wireless communication. The first method generally includes detecting a failure to receive a first communication from a network entity. The first method may also include determining one or more communication metrics associated with the first communication. The first method may also include selecting a physical parameter configured to identify the one or more communication metrics associated with the first communication. The first method may also include transmitting a second communication in accordance with the selected physical parameter to the network entity in response to detecting the failure to receive the first communication.

Certain aspects provide a second method for wireless communication. The second method generally includes transmitting a first communication to a network entity. The second method may also include receiving a second communication configured to request a re-transmission of the first communication. The second method may also include identifying one or more communication metrics associated with the first communication based on a physical parameter used to transmit the second communication. The second method may also include re-transmitting the first communication in accordance with the communication metric identified based on the physical parameter to the network entity.

Certain aspects provide a first apparatus for wireless communication. The first apparatus generally includes a memory and a processor communicatively coupled to the memory, wherein the processor is configured to detect a failure to receive a first communication from a network entity. The processor may also be configured to determine one or more communication metrics associated with the first communication. The processor may also be configured to select a physical parameter configured to identify the one or more communication metrics associated with the first communication. The processor may also be configured to transmit a second communication in accordance with the selected physical parameter to the network entity in response to detecting the failure to receive the first communication.

Certain aspects provide a second apparatus for wireless communication. The second apparatus generally includes a memory and a processor communicatively coupled to the memory, wherein the processor is configured to transmit a first communication to a network entity. The processor may also be configured to receive a second communication configured to request a re-transmission of the first communication. The processor may also be configured to identify one or more communication metrics associated with the first communication based on a physical parameter used to transmit the second communication. The processor may also be configured to re-transmit the first communication in accordance with the communication metric identified based on the physical parameter to the network entity.

Certain aspects provide an apparatus for wireless communication. In some examples, the apparatus includes means for detecting a failure to decode a first communication from a network entity. In some examples, the apparatus includes means for determining one or more communication metrics associated with the first communication. In some examples, the apparatus includes means for selecting a physical parameter configured to identify the one or more communication metrics associated with the first communication. In some examples, the apparatus includes means for transmitting a second communication in accordance with the selected physical parameter to the network entity in response to detecting the failure to decode the first communication.

Certain aspects provide a non-transitory computer-readable storage medium that stores instructions that when executed by a processor of an apparatus cause the apparatus to perform a method of wireless communication. In some examples, the method includes detecting a failure to decode a first communication from a network entity. In some examples, the method includes determining one or more communication metrics associated with the first communication. In some examples, the method includes selecting a physical parameter configured to identify the one or more communication metrics associated with the first communication. In some examples, the method includes transmitting a second communication in accordance with the selected physical parameter to the network entity in response to detecting the failure to decode the first communication.

Certain aspects provide an apparatus for wireless communication. In some examples, the apparatus includes means for transmitting a first communication to a network entity. In some examples, the apparatus includes means for receiving a second communication configured to request a re-transmission of the first communication. In some examples, the apparatus includes means for identifying one or more communication metrics associated with the first communication based on a physical parameter used to transmit the second communication. In some examples, the apparatus includes means for re-transmitting the first communication in accordance with the communication metric identified based on the physical parameter to the network entity.

Certain aspects provide a non-transitory computer-readable storage medium that stores instructions that when executed by a processor of an apparatus cause the apparatus to perform a method of wireless communication. In some examples, the method includes transmitting a first communication to a network entity. In some examples, the method includes receiving a second communication configured to request a re-transmission of the first communication. In some examples, the method includes identifying one or more communication metrics associated with the first communication based on a physical parameter used to transmit the second communication. In some examples, the method includes re-transmitting the first communication in accordance with the communication metric identified based on the physical parameter to the network entity.

Aspects of the present disclosure provide means for, apparatus, processors, and computer-readable mediums for performing the methods described herein. Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
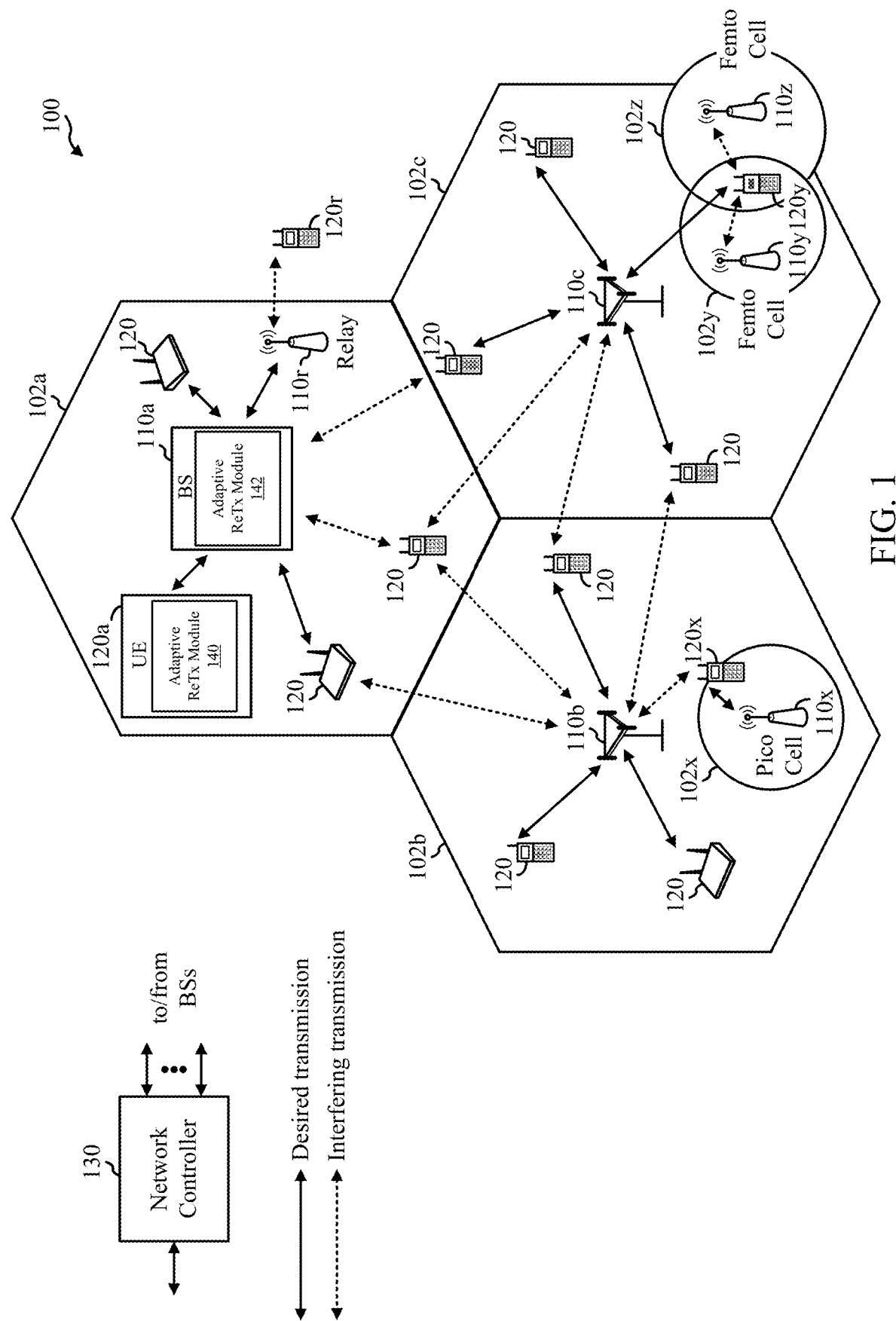
FIG. 1 is a block diagram conceptually illustrating an example telecommunications system, in accordance with certain aspects of the present disclosure.

Aspects of the present disclosure provide apparatus, methods, processing systems, and computer readable mediums for adaptive hybrid automatic repeat request (HARQ) communication for changing a phase tracking reference signal (PTRS) configuration between one or more re-transmissions.

PTRSs are intended for tracking phase variations across a transmission duration (e.g., a slot). Phase variations can come from, for example, phase noise in oscillators, primarily at higher carrier frequencies. For example, the power of phase noise and phase distortion can be amplified in higher frequency bands, such as those in millimeter wave (mmW) frequencies. For instance, as a carrier frequency becomes higher, phase noise power becomes stronger (e.g., frequency range 4 (FR4) is subject to stronger phase noise power relative to FR2). Thus, in higher carrier frequencies (e.g., frequencies greater than 52.6 GHz), stronger phase noise can be expected.

PTRS may be used to assist tracking and correcting phase noise by adding, eliminating, or adjusting PTRSs in a re-transmission. Thus, PTRS may be included in downlink and uplink data communications, and may be configured by radio resource control (RRC) communications. However, RRC may not be sufficiently flexible (e.g., requires too much time) to adjust PTRS between re-transmissions. For example, if a first transmission from a base station to a UE fails due to low PTRS pilot density, RRC cannot be relied on to reconfigure the PTRS within the relatively short re-transmission time period. Thus, it would be beneficial to adjust or change the PTRS configuration (e.g., modify the PTRS pilot density) for re-transmission of the first transmission within a shorter period of time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). As shown in FIG. 1, UE 120a includes an adaptive re-transmission (ReTx) module 140 that may be configured for adaptive HARQ communications and for changing a PTRS configuration between one or more re-transmissions, according to aspects described herein. Similarly, the BS 110a includes an adaptive re-transmission module 142 that may be configured for adaptive HARQ communications and for changing a PTRS configuration between one or more re-transmissions, according to aspects described herein.

As illustrated in FIG. 1, the wireless communication network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
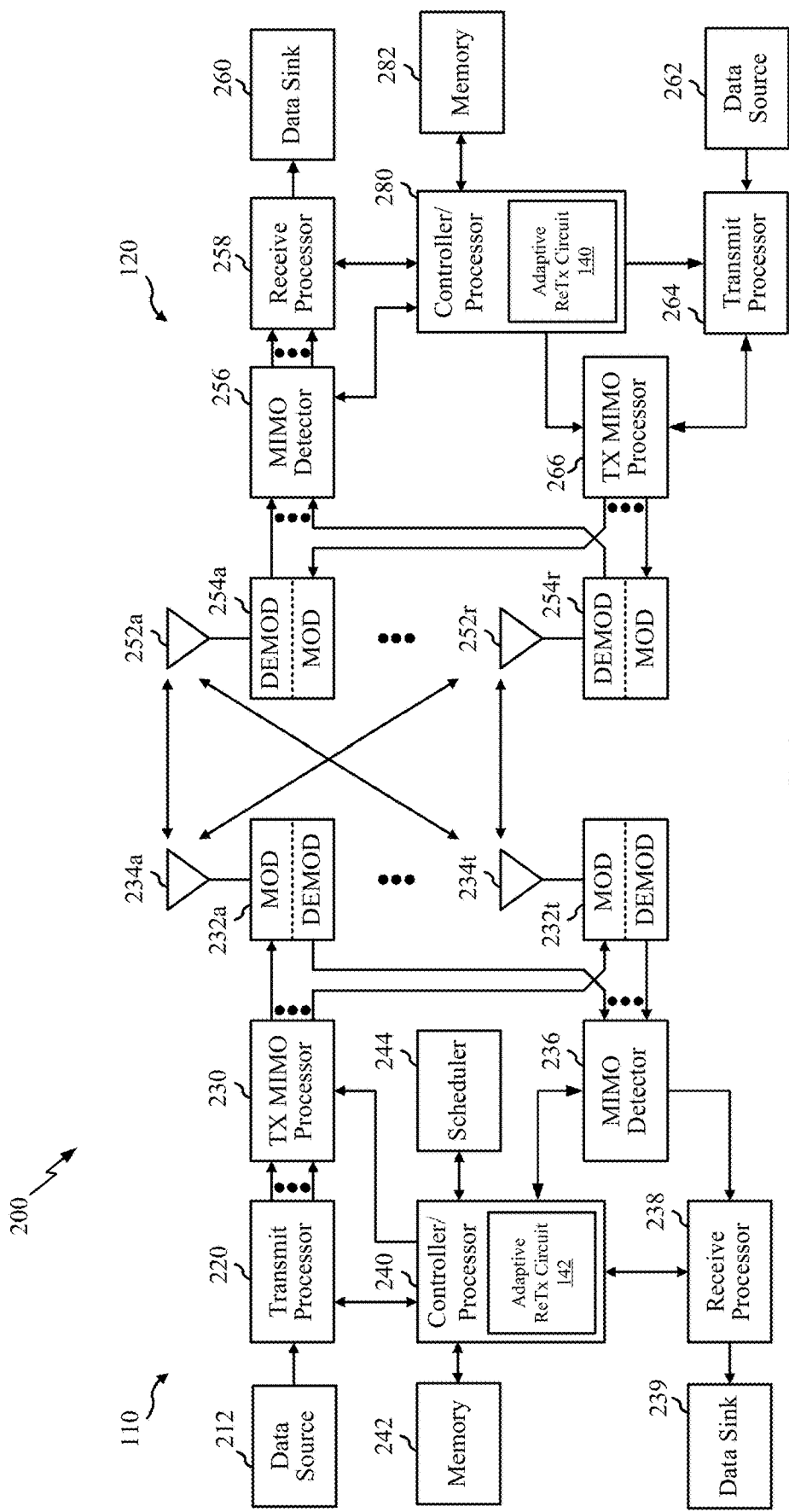
FIG. 2 is a block diagram conceptually illustrating a design of an example base station (BS) and user equipment (UE), in accordance with certain aspects of the present disclosure.

FIG. 2 illustrates example components 200 of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. As shown in FIG. 2, the controller/processor 240 of the BS 110 includes an adaptive re-transmission (ReTx) circuit 142 that may be configured for adaptive HARQ communications and for changing a PTRS configuration between one or more re-transmissions, according to aspects described herein. The controller/processor 280 of the UE 120 also includes an adaptive ReTx circuit 140 that may be configured for adaptive HARQ communications and for changing a PTRS configuration between one or more re-transmissions, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
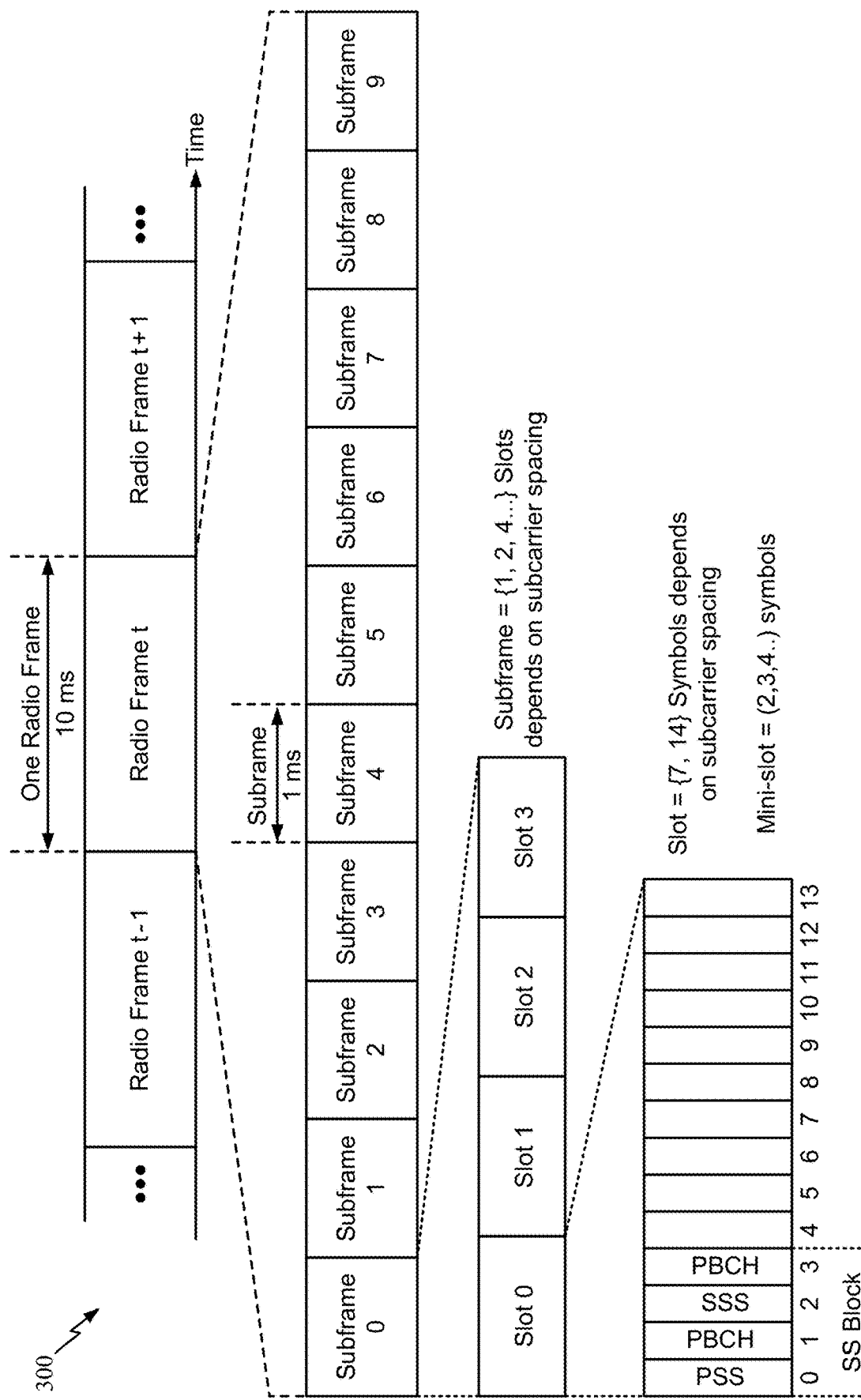
FIG. 3 illustrates an example of a frame format for a new radio (NR) system, in accordance with certain aspects of the present disclosure.

FIG. 3 is a diagram showing an example of a frame format 300 for NR. It should be understood by those of ordinary skill in the art that the various aspects of the present disclosure may be applied to a DFT-s-OFDMA waveform or a CP-OFDM waveform in substantially the same way as described herein. That is, while some examples of the present disclosure may focus on an OFDM link for clarity, it should be understood that the same principles may be applied as well to DFT-s-OFDMA and CP-OFDM waveforms.

The transmission timeline for each of the downlink and uplink may be partitioned into units of radio frames. Here, time is in the horizontal direction with units of OFDM symbols; and frequency is in the vertical direction with units of subcarriers or tones. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a sub-slot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., an RRC dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AP, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Adaptive HARQ Communication Using Phase Tracking Reference Signals

Data transmission in both LTE and NR systems is dynamically scheduled in both uplink and downlink. To exploit typically varying radio conditions, channel-dependent scheduling can be used. For each 1-ms subframe, a scheduler (e.g., scheduler 244) controls which UEs communicate, as well as the time and frequency resources used in the communication. To handle transmission errors, fast hybrid automatic repeat request (HARQ) acknowledgement (ACK) or negative acknowledgement (NACK) with soft combining may be used.

HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NAK may be transmitted. In response to a NAK, the transmitting device may send a HARQ re-transmission (ReTx), which may implement one or more soft combining schemes such as chase combining, incremental redundancy (IR), etc. In one example, upon reception of a downlink communication, a UE may indicate the outcome of the decoding operation to the base station (e.g., an ACK/NAK). In some examples, the ACK/NAK is indicated via uplink control signaling from the UE, and carried on the physical uplink control channel (PUCCH).

As with HARQ, soft combining is a technique known to those of ordinary skill in the art, wherein a receiver (e.g., receive processor 258) combines data from multiple transmission attempts. For example, when a prior transmission fails or is reported as NAK, the base station will retransmit a version of the failed transmission. At the UE side, re-transmissions may be soft combined with the prior transmissions in buffers to decode. HARQ with soft combining, regardless of whether chase combining or incremental redundancy is used, leads to a reduction of the data rate by means of re-transmissions.

However, in millimeter wave (mmW) communications, phase noise or "phase distortion" can be amplified with higher power in certain frequency bands. Generally, phase distortion is a measure of how stable the signal is in frequency domain, its value given in dBc/Hz for an offset frequency, wherein the offset frequency is a deviation from a desired frequency. In higher carrier frequencies (e.g., frequencies greater than 52.6 GHz), stronger phase noise can be expected. In some examples, phase noise can be quantified by determining signal to noise ratio (SNR) or signal to interference plus noise ratio (SINR). In lower carrier frequencies (e.g., 24-52.6 GHz) phase tracking reference signals (PTRS) may be used to assist tracking and correcting phase noise. For example, a PTRS may be included in downlink and uplink data communications. However, PTRS configuration is RRC controlled and currently not sufficiently flexible to change between one or more re-transmissions. In some examples, PTRS configuration may relate to turning PTRS on or off, modulating the PTRS time domain and frequency domain pattern, and/or changing a PTRS pattern within a symbol of a single carrier waveform. For example, if a first transmission from a base station to a UE fails due to low PTRS pilot density in the time domain, it would be beneficial to adjust or change the PTRS configuration to increase the PTRS pilot density in a re-transmission of the first transmission.

According to various aspects of the present disclosure, any variety of options may be utilized to implement the adaptive HARQ communication techniques described herein, and change a PTRS configuration between one or more re-transmissions. It should be noted that the disclosure is not limited to the use of a PTRS, and that any suitable reference signal may be used according to the techniques disclosed herein. For example, one or more of a demodulation reference signal (DMRS), a sounding reference signal (SRS), a physical broadcast channel (PBCH) reference signal (PBCHRS), or a channel state information reference signal (CSI-RS) can be used within the scope of this disclosure.

Figure 4:
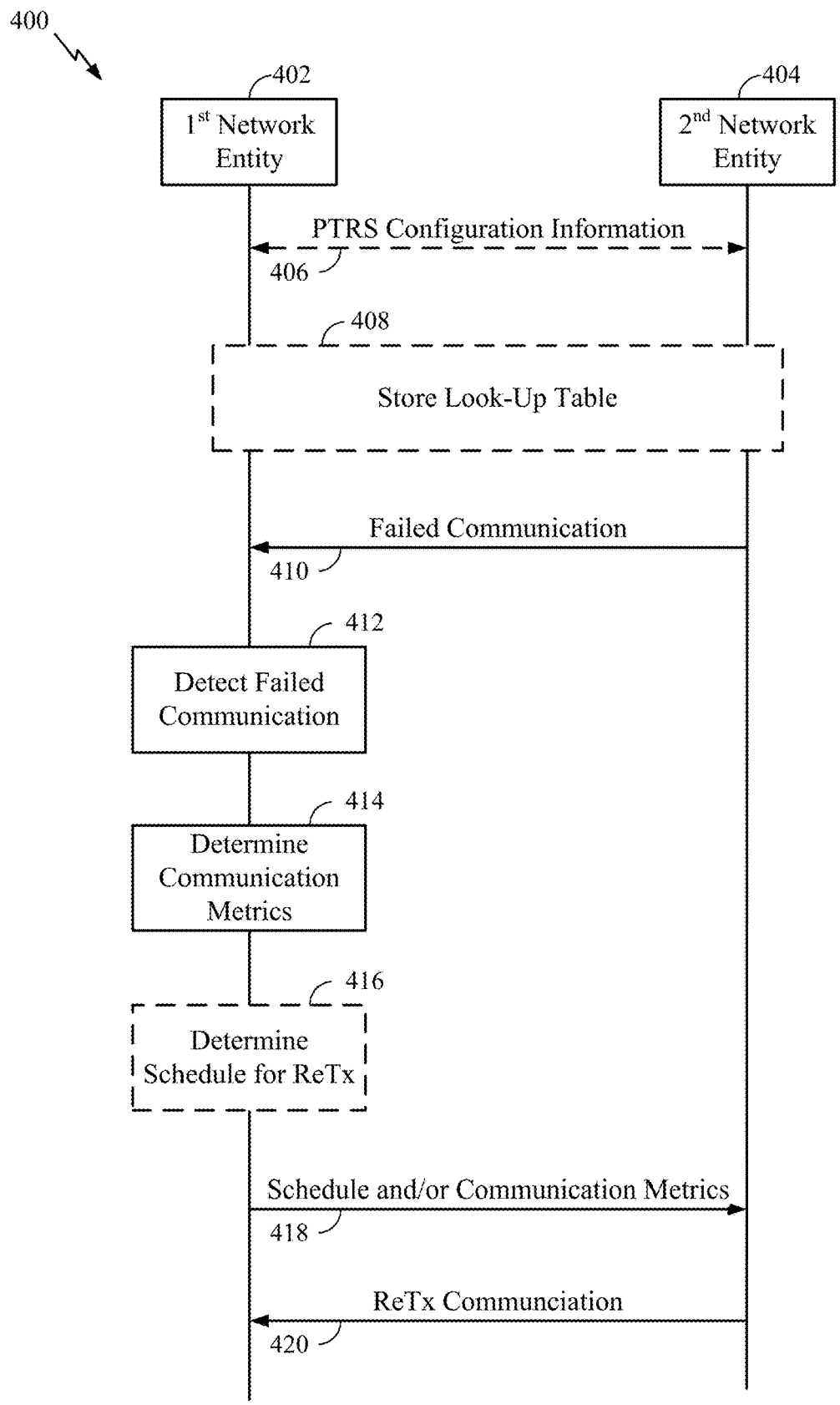
FIG. 4 is a call flow diagram conceptually illustrating an exemplary process of an adaptive HARQ communication in accordance with certain aspects of the present disclosure.

FIG. 4 is a call flow diagram conceptually illustrating an exemplary process of an adaptive HARQ ACK communication 400 in accordance with certain aspects of the present disclosure. In this figure, communication between network entities is illustrated by arrows between lines extending from the respective entities, in sequence, with time moving forward in the downward direction. Other embodiments may have other sequence actions or varied implementation orders as desired. In one example, the first network entity 402 may be a user equipment (UE) as illustrated in any one or more of FIGS. 1, 2, 4, and/or 8, and the second network entity 404 may be a base station (BS) as illustrated in any one or more of FIGS. 1, 2, 4, and/or 8. Alternatively, the first network entity 402 may be a base station as illustrated in any one or more of FIGS. 1, 2, 4, and/or 8, and the second network entity 404 may be a user equipment (UE) as illustrated in any one or more of FIGS. 1, 2, 4, and/or 8.

Initially, the first network entity 402 and the second network entity 404 may establish a communication session, and communicate RS configuration information in a first communication 406 from the first network entity 402 to the second network entity 404, from the first network entity 402 to the second network entity 404, or both. In some configurations, the first communication 406 includes a radio resource control (RRC) message.

The RS configuration information may include a look-up table 408 identifying a plurality of candidate RS patterns, wherein each pattern is indexed by one or more reasons for a re-transmission (ReTx) (e.g., reasons for re-transmission may include one or more of a reason for the failure to decode a previously transmitted communication, a soft decoding status of data associated with the previously transmitted communication, and/or a recommended configuration for a re-transmission of the previously transmitted communication). As such, if the first network entity 402 detects a failed transmission, the first network entity 402 may transmit a communication metric to the second network entity 404 using a physical parameter (e.g., a resource allocation of the transmission and/or a bit field of the transmission). Here, the communication metric is configured to provide the first network entity 402 a means for communicating one or more reasons for a re-transmission, and provide the second network entity with a means for identifying the one or more reasons for a re-transmission. The second network entity 404 may then identify an RS pattern from the candidate RS patterns by mapping the communication metric to the identified RS pattern via the look-up table 408.

In some examples, the physical parameter may include a plurality of different resource allocations (e.g., different frequency-domain resources for transmission, such as resource allocation type 0 and resource allocation type 1), wherein each resource allocation corresponds to one or more communication metrics (e.g., reasons for re-transmission). Reasons for re-transmission may include phase distortion, specific values of phase distortion, insufficient CP length, etc.

The physical parameter may also include a state indicated by one or more explicit bits in a transmission. For example, the look-up table 408 may provide the first network entity 402 and the second network entity 404 with a shared table of RSs indexed by values that map an RS to an explicit bit configured to identify an RS in the look-up table. In one example, the first network entity 402 may detect a failed communication. In response to the detection, the first network entity 402 may transmit signaling that contains an explicit bit that the second network entity 404 can map to an RS in the look-up table 408. The second network entity 404 can then re-transmit a previous transmission using the RS identified by the first network entity 402. The first network entity 402 and/or the second network entity 404 may store the RS configuration information on a local memory device.

It should be noted that the first communication 406 and the storing of the look-up table is optional. For example, in some configurations, the RS configuration information may be configured at the first network entity 402 and the second network entity 404 according to a wireless communication standard or a predefined network rule. In such a case, each entity may be preconfigured with a look-up table or other suitable means for mapping the one or more physical parameters to a communication metric.

During the communication session, in a second communication 410, the second network entity transmits a failed communication to the first network entity 402. In some examples, the failed communication may include an uplink communication from a UE to a base station, or a downlink communication from a base station to a UE. The first network entity 402 detects the failed communication 412 by determining a decoding error during processing of the failed communication, or by determining that a scheduled communication was not received. Upon detecting the failed communication, the first network entity 402 may determine one or more communication metrics 414 associated with the failed communication.

In one example, the communication metrics may include one or more suspected reasons for the failure of the second communication 410. In some configurations, the first network entity 402 may determine that the communication failed because of phase distortion. In some configurations, the first network entity 402 may determine that the failed communication included an insufficient cyclic prefix (CP) length (e.g., inter-symbol interference (ISI) prevented successful decoding of the communication).

In another example, the communication metrics may include a soft decoding status of data associated with the failed communication. In some configurations, the first network entity 402 may determine a level of decoding based on a logarithmic-likelihood ratio (LLR), and/or an expected additional amount of data to achieve decoding of data associated with the failed communication. It should be noted that data associated with the failed communication may include data successfully received in a previous communication that relies on other data provided in the failed communication, or data received and partially decoded from the failed communication.

In another example, the communication metrics may include a recommended re-transmission configuration of a signal for communicating data from the failed communication. In some configurations, the first network entity 402 may determine a size of the re-transmission data, a redundancy version (RV) of the re-transmission, and/or a RS pattern for the re-transmission. In some configurations, the first network entity 402 may determine a recommended re-transmission configuration based on the suspected reasons for failure and/or the soft decoding status. For example, the first network entity 402 may determine a size of the re-transmission data based on the soft decoding status. In another example, the first network entity 402 may determine a RS pattern based on the suspected reasons for failure.

Optionally, the first network entity 402 may determine a schedule 416 for a re-transmission of the failed communication. For example, if the failed communication is an uplink communication intended to be received by a base station, the base station may determine time and frequency domain resources for a re-transmission of the uplink communication.

In a third communication 418, the first network entity 402 may communicate the schedule and/or communication metrics to the second network entity 404. In some configurations, the third communication 418 may include HARQ NAK signaling configured to convey the schedule and/or communication metrics. For example, the NAK can be conveyed using physical parameters of the third communication, such as time and frequency domain resources, and/or explicit bits set in the third communication.

In some configurations, the third communication 418 may include a portion of a slot configured for communicating feedback (e.g., ACK/NAK). In some examples, the feedback portion of the slot includes a plurality of bits corresponding to a number of states. For example, depending on the format of the communication, the NAK portion of the slot may include 4-bits which can be used to represent up to 16 states. In this example, the look-up table may include up to 16 RSs indexed according to the 16 states of the 4-bit NAK. It should be noted that other bit ranges are contemplated and within the scope of the disclosure.

In some configurations, the NAK portion of the slot may fall within a plurality of positions within the slot. That is, the NAK portion of the slot may be characterized by a variety of time and frequency domain resources within that slot. In some examples, each slot may include one or more transmit and one or more receive portions. For example, in an uplink centric slot (e.g., a slot structure wherein more resources are allocated for transmission in the uplink direction), the first network entity 402 may have an opportunity to transmit the NAK in an uplink control portion of the slot (e.g., on a PUCCH), in an uplink data portion of the slot (e.g., on a PUSCH), or in an uplink burst region of the slot. Similarly, a downlink centric slot may provide the first network entity 402 with a variety of time and frequency domain resources within that slot.

Once the second network entity 404 receives the third communication 418, it generates a re-transmission 420 of the failed communication according to the information provided in the third communication 418, and transmits the re-transmission 420 to the first network entity 402.

Downlink Re-transmission

Still referring to FIG. 4, in an example where the first network entity 402 is a UE (e.g., UE 120a) and the second network entity is a base station (e.g., BS 110a), the BS 110a will first determine a configuration for the downlink re-transmission 420 based on the third communication 418, and will notify the UE 120a of the determined configuration prior to transmitting the downlink re-transmission 420. In some embodiments, the configuration includes a schedule (e.g., time and frequency domain resources for the re-transmission communication 420), an RS pattern to be used in the downlink re-transmission 420 (e.g., a particular density and/or pattern of the RS), and/or whether an RS will be used or not. In some configurations, the RS pattern used in the downlink re-transmission 420 is a different pattern than the RS used in the failed communication.

In some configurations, the BS 110a notifies the UE 120a of the determined configuration via downlink control information (DCI) message. The DCI message is communicated over the PDCCH and provides the configuration via power control commands, scheduling information, a grant, and/or an assignment of resource elements for downlink and/or uplink transmissions.

In other configurations, the BS 110a is not required to notify the UE 120a of the configuration of the downlink re-transmission 420. Instead, the BS 110a determines the configuration of the downlink re-transmission 420 based on which entry in the look-up table corresponds to the information provided by the UE 120a in the third communication. For example, if the UE 120a determines that phase distortion is the reason for the failed communication, the UE 120a may set one or more physical parameters of the third communication 418 to indicate to the BS 110a the reason and/or a particular RS for re-transmission identifiable in the stored look-up table. In this configuration, the BS will proceed to transmit the downlink re-transmission 420 without notifying the UE 120a of the configuration of the re-transmission.

Uplink Re-Transmission

Still referring to FIG. 4, in an example where the first network entity 402 is a BS (e.g., BS 110a) and the second network entity is a user equipment (e.g., UE 120a), the BS 110a will first determine a configuration for the uplink re-transmission 420 based on the third communication 418, and will notify the UE 120a of the determined configuration prior to the UE 120a transmitting the uplink re-transmission 420. In some embodiments, the configuration includes a schedule (e.g., time and frequency domain resources for the re-transmission communication 420), a RS pattern to be used in the re-transmission communication 420 (e.g., a particular density and/or pattern of the RS), and/or whether a RS will be used or not. In some configurations, the RS pattern used in the re-transmission communication 420 is a different pattern than the RS used in the failed communication.

In some configurations, the BS 110a notifies the UE 120a of the determined configuration via downlink control information (DCI) message. The DCI message may provide the UE 120a with a grant indicating the time and frequency domain resources to be utilized for the uplink re-transmission 420, as well as other configuration information (e.g., the RS pattern, density, etc.).

In other configurations, the BS 110a is not required to notify the UE 120a of all the configuration information of the uplink re-transmission 420 in the third communication 418. Instead, the BS 110a may communicate a physical parameter that corresponds to a predefined value in a look-up table stored on the UE 120a. For example, the BS 110a may communicate a physical parameter (e.g., one or more bit values in a NAK) that corresponds to a reason for the failed communication and/or a particular RS for re-transmission identifiable in the stored look-up table.

FIGS. 5A-5E illustrate examples of different reference signal (RS) patterns (e.g., PTRS, DMRS, SRS, etc.) for a single carrier waveform. As shown, each pattern includes 64 symbols in a time dimension (X-axis) relative to power (e.g., μW) of each symbol (Y-axis). Pilot signals are illustrated as having a value of 2 μW on the Y-axis. Symbols having a zero value on the Y-axis are symbols that may carry data. Each of FIGS. 5A-5E illustrate different RS patterns having the same RS density. However, each of the illustrated RS patterns may be suited for a particular range of noise.

Figure 5A:
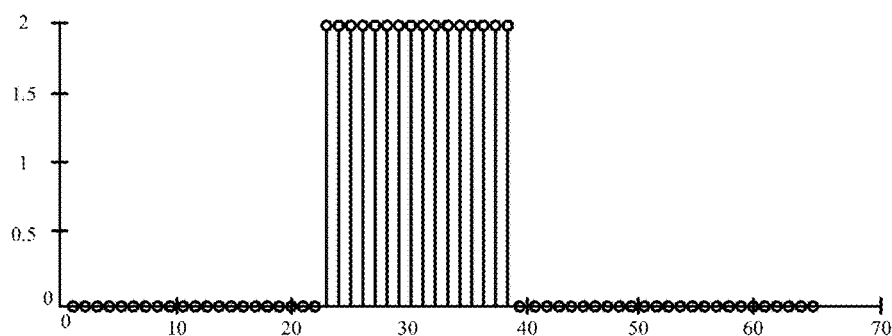
FIGS. 5A-5E illustrate examples of PTRS patterns that may be used for re-transmission of failed communications in accordance with aspects of the present disclosure.
Figure 5B:
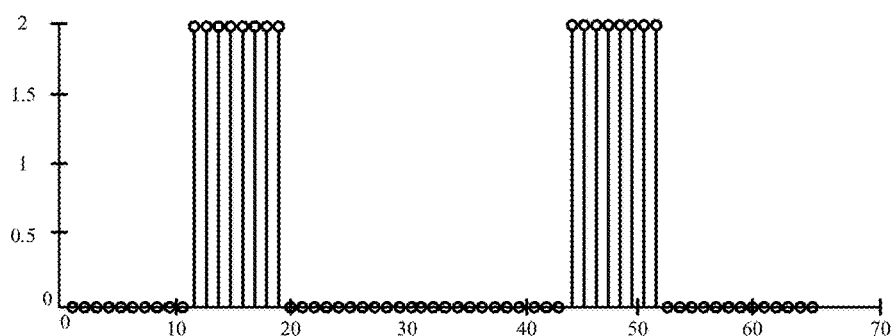
Figure 5C:
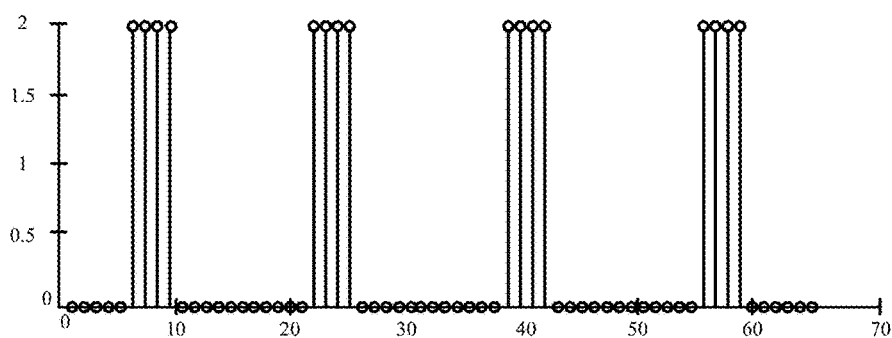
Figure 5D:
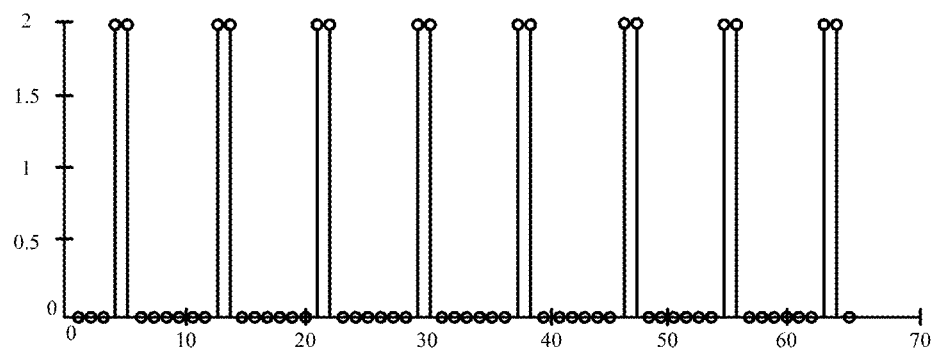
Figure 5E:
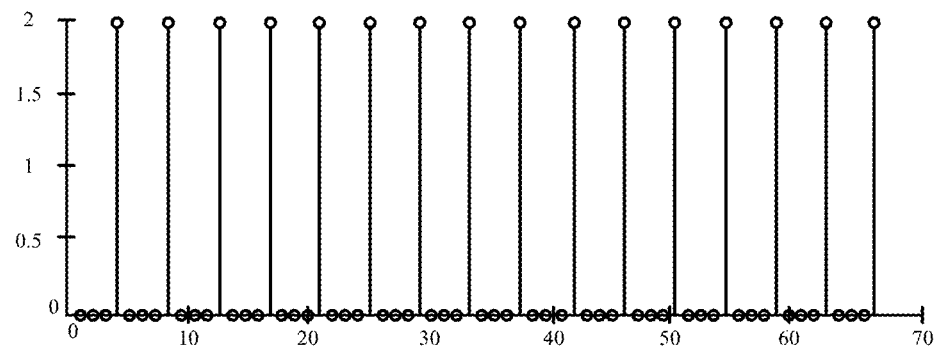

FIG. 5A illustrates a first RS pattern that may be useful for data transmissions with low noise (e.g., low SNR). FIG. 5E illustrates a fifth RS pattern that may be most useful for data transmissions having high noise. FIGS. 5B-5D may be useful for varying levels of noise between a low noise threshold (e.g., that shown in FIG. 5A) and high noise threshold (e.g., that shown in FIG. 5E).

Figure 6A:
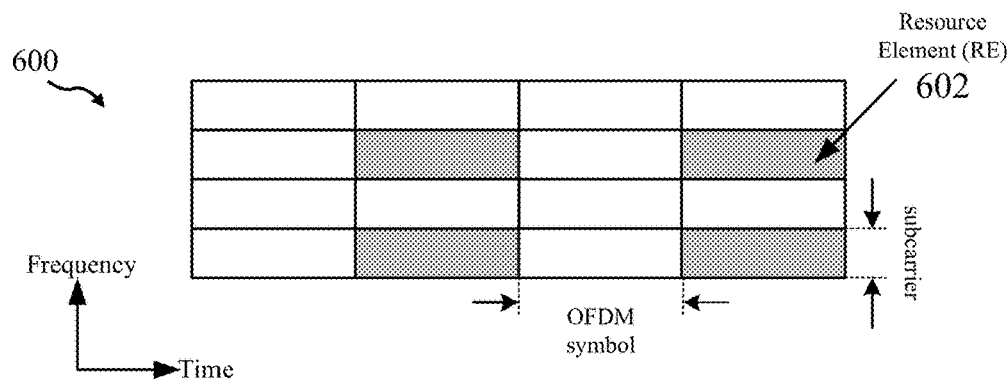
FIGS. 6A-6C are schematics illustrating example reference signal densities on an OFDM waveform, in accordance with certain aspects of the present disclosure.
Figure 6B:
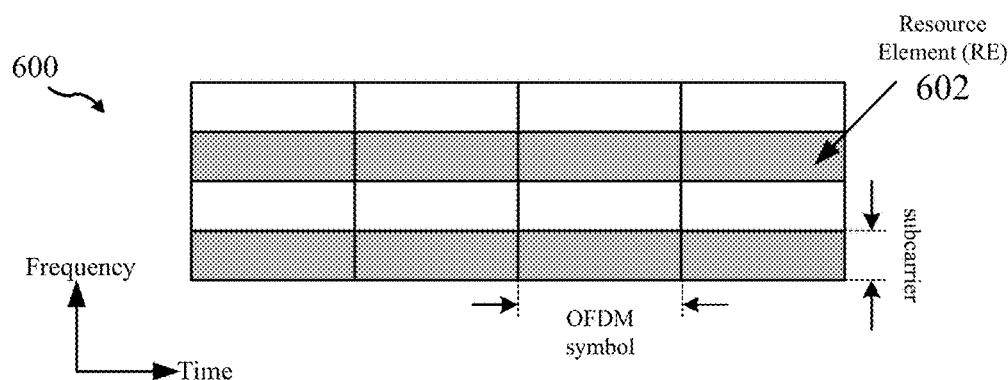
Figure 6C:
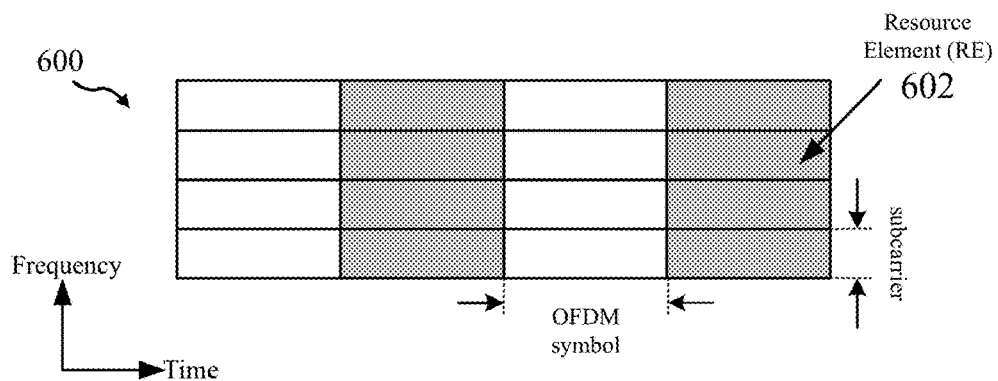

FIGS. 6A-6C illustrate examples of different RS patterns on a schematic of an OFDM resource grid 600. In the examples of FIGS. 6A-6C, the example OFDM resource grid is illustrated as a 4×4 grid of multiple resource elements (REs) 602 to schematically represent time-frequency resources. An RE, which is 1 subcarrier–1 symbol, is the smallest discrete part of the time-frequency grid, and contains a single complex value representing data from a physical channel or signal. REs 602 may carry pilots or RSs. These pilots or RSs may provide for a receiving device to perform channel estimation of the corresponding channel. In each of FIGS. 6A-6C, an RE carrying a pilot or reference signal is shaded, with time in the horizontal direction with units of OFDM symbols, and frequency in the vertical direction with units of subcarriers or tones.

In the example of FIG. 6A, a first RS pattern is illustrated where the RS occupies four of the sixteen REs 602. In the example, of FIG. 6B, a second RS is illustrated having a higher density in the time domain relative to FIG. 6A. In the example of FIG. 6C, a third RS is illustrated having a higher density in the frequency domain relative to FIGS. 6A and 6B.

Figure 7:
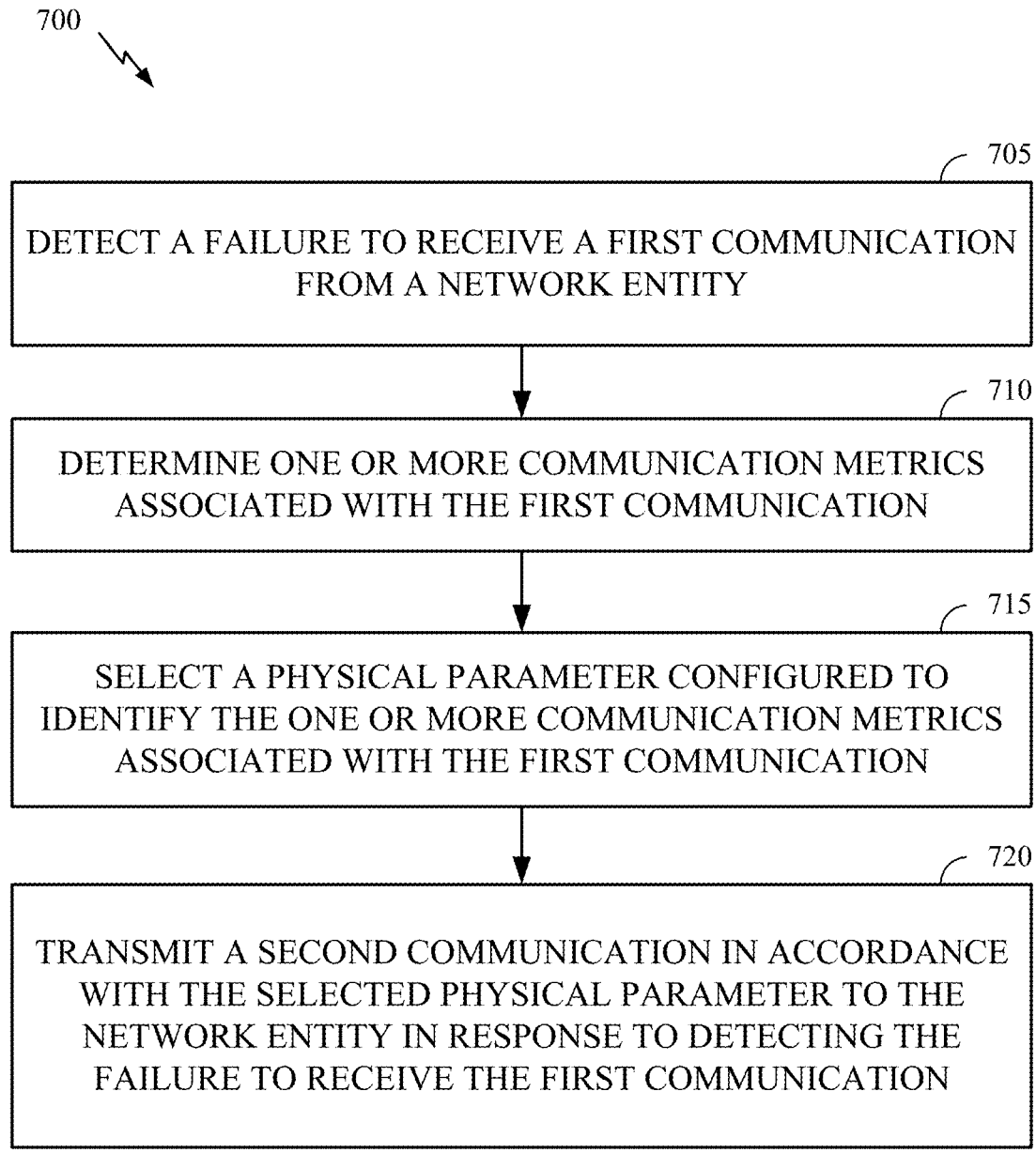
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., BS 110a in the wireless communication network 100) or a UE (e.g., UE 120a in the wireless communication network 100). Operations 700 may be implemented as software components that are executed and run on one or more processors (e.g., controller/processor 240 and 280 of FIG. 2). Further, the transmission and reception of signals in operations 700 may be enabled, for example, by one or more antennas (e.g., antennas 234 and 252 of FIG. 2). In certain aspects, the transmission and/or reception of signals may be implemented via a bus interface of one or more processors (e.g., controller/processor 240 and 280) obtaining and/or outputting signals.

The operations 700 may begin, at block 705, by detecting, at a first network entity, a failure to decode and/or receive a first communication from a second network entity. The failure may be detected by a determination that the first network entity failed to decode the first communication, or that a scheduled communication was not received.

At block 710, the first network entity determines one or more communication metrics associated with the first communication. In some configurations, the communication metrics include one or more of a reason for the failure of the first communication, a soft decoding status of data associated with the first communication, and/or a recommended configuration for a re-transmission of the first communication.

In some configurations, the reason for the failure to receive the first communication comprises one or more of a phase distortion of the first communication, or an insufficient cyclic prefix length of the first communication. In such as case, a different cyclic prefix length will be applied in a subsequent re-transmission or second transmission. In some examples, the soft decoding status comprises one or more of a level of decoding based on a logarithmic likelihood ratio (LLR), or an amount of data required for decoding a block of data associated with data contained in the first communication. In other examples, the recommended configuration for the re-transmission of the first communication comprises one or more of a redundancy version of the re-transmission, or a reference signal pattern for the re-transmission.

At block 715, the first network entity selects a physical parameter configured to identify the one or more communication metrics associated with the first communication. In some configurations, the physical parameter of the second communication includes one or more of a resource allocation of the second communication, or a bit field in the second communication. In some configurations, the physical parameter is configured to identify a first phase tracking reference signal of the plurality of phase tracking reference signals to be used in a re-transmission of the first communication.

At block 720, the first network entity transmits a second communication in accordance with the selected physical parameter to the second network entity 404 in response to detecting the failure to receive the first communication. In some configurations, the second communication is configured to request a re-transmission of the first communication according to the one or more communication metrics.

In certain aspects, the second communication is configured to request a re-transmission of the first communication according to the one or more communication metrics.

In certain aspects, operations 700 further comprise receiving, from the network entity, a re-transmission of the first communication in accordance with the one or more communication metrics.

In certain aspects, one of the first communication or the second communication includes a reference signal, and wherein the other of the first communication and the second communication excludes a reference signal.

In certain aspects, the first communication comprises a first reference signal, wherein the second communication comprises a second reference signal, and wherein the second reference signal is different from the first reference signal.

In certain aspects, the difference between the first reference signal and the second reference signal includes one or more of: a pattern of the second reference signal relative to the first reference signal, a time dimension density of the second reference signal relative to the first reference signal, or a frequency dimension density of the second reference signal relative to the first reference signal.

In certain aspects, the physical parameter of the second communication comprises one or more of a resource allocation of the second communication, or a bit field in the second communication.

In certain aspects, the communication metrics comprise one or more of: a reason for the failure to decode the first communication; a soft decoding status of data associated with the first communication; or a recommended configuration for a re-transmission of the first communication.

In certain aspects, the reason for the failure to decode the first communication comprises one or more of a phase distortion of the first communication, or an insufficient cyclic prefix length of the first communication.

In certain aspects, the soft decoding status comprises one or more of a level of decoding based on a logarithmic likelihood ratio (LLR), or an amount of data required for decoding a block of data associated with data contained in the first communication.

In certain aspects, the recommended configuration for the re-transmission of the first communication comprises one or more of a redundancy version of the re-transmission, or a reference signal pattern for the re-transmission.

In certain aspects, the reference signal pattern of the re-transmission is different from a reference signal pattern of the first communication.

In certain aspects, operations 700 further comprise receiving, from the network entity, a message comprising a plurality of candidate reference signal patterns.

In certain aspects, a first reference signal pattern of the plurality of reference signal patterns to be used in a re-transmission of the first communication is identified based on at least one of the message from the network entity, or a predefined network rule.

In certain aspects, the message from the network entity further comprises an indication indexing the plurality of candidate reference signal patterns by the one or more communication metrics.

In certain aspects, operations 700 further comprising receiving, from the network entity, the re-transmission of the first communication, wherein the re-transmission includes the identified first reference signal pattern.

In certain aspects, the first communication comprises a downlink communication, and wherein the second communication comprises an uplink communication characterized by a hybrid automatic repeat request (HARD) negative acknowledgment (NAK).

In certain aspects, operations 700 further comprise receiving a re-transmission configuration message from the network entity in response to the uplink communication, wherein the re-transmission configuration message comprises one or more of: a schedule of the re-transmission of the downlink communication; a reference signal pattern of the re-transmission of the failed downlink communication; or a density of the reference signal pattern.

In certain aspects, the reference signal is a phase tracking reference signal.

In certain aspects, the re-transmission configuration message is a downlink control information (DCI) message.

In certain aspects, the first communication comprises an uplink communication, wherein the second communication comprises a downlink communication.

In certain aspects, the downlink communication comprises a downlink control information (DCI) message.

In certain aspects, operations 700 further comprise receiving, from the network entity, a plurality of candidate reference signal patterns to be used in a re-transmission of the first communication, wherein the plurality of candidate reference signal patterns are indexed according to one or more communication metrics.

In certain aspects, operations 700 further comprise transmitting, to the network entity, a plurality of candidate reference signal patterns to be used in a re-transmission of a communication originating from the network entity, wherein the plurality of candidate reference signal patterns are indexed according to one or more communication metrics.

In some configurations, the first communication includes a downlink communication, and the second communication includes an uplink communication characterized by a hybrid automatic repeat request (HARQ) negative acknowledgment (NAK). In one example, the first network entity may receive a re-transmission configuration message from the second network entity in response to the uplink communication. In this example, the re-transmission configuration message may include one or more of a schedule of the re-transmission of the downlink communication, a reference signal pattern of the re-transmission of the first communication, or a density of the reference signal pattern. In some examples, the reference signal is a phase tracking reference signal.

Alternatively, the first communication includes an uplink communication, and the second communication includes a downlink communication (e.g., a DCI) message.

Figure 8:
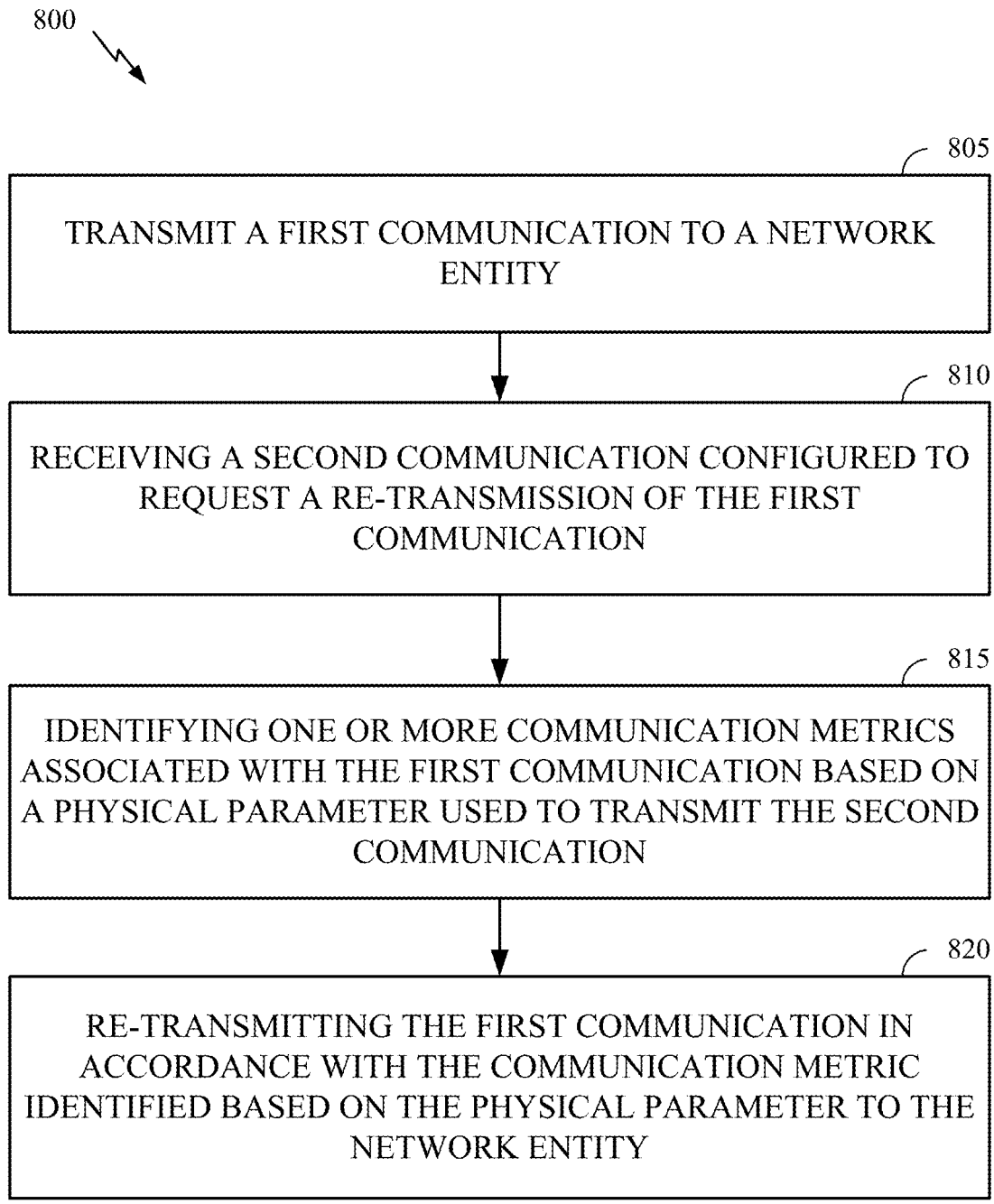
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., BS 110a in the wireless communication network 100) or a UE (e.g., UE 120a in the wireless communication network 100). Operations 800 may be implemented as software components that are executed and run on one or more processors (e.g., controller/processor 240 and 280 of FIG. 2). Further, the transmission and reception of signals in operations 800 may be enabled, for example, by one or more antennas (e.g., antennas 234 and 252 of FIG. 2). In certain aspects, the transmission and/or reception of signals may be implemented via a bus interface of one or more processors (e.g., controller/processor 240 and 280) obtaining and/or outputting signals.

The operations 800 may begin, at block 805, by transmitting, by a first network entity, a first communication to a second network entity.

At block 810, the first network entity receives, from the second network entity a second communication configured to request a re-transmission of the first communication.

At block 815, the first network entity identifies one or more communication metrics associated with the first communication based on a physical parameter used to transmit the second communication. In some configurations, the physical parameter of the second communication includes one or more of a resource allocation of the second communication, or a bit field in the second communication. For example, the communication metrics may include one or more of a reason for the re-transmission of the first communication, a soft decoding status of data associated with the first communication, or a recommended configuration for a re-transmission of the first communication.

In some configurations, the reason for the re-transmission includes one or more of a phase distortion of the first communication, or an insufficient cyclic prefix length of the first communication. In such as case, a different cyclic prefix length will be applied in a subsequent re-transmission or second transmission. In some examples, the soft decoding status comprises one or more of a level of decoding based on a logarithmic likelihood ratio (LLR), or an amount of data required for decoding a block of data associated with data contained in the first communication. Similarly, in some examples, the recommended configuration for the re-transmission of the first communication comprises one or more of a redundancy version of the re-transmission, or a reference signal pattern for the re-transmission. In some examples, the physical parameter is configured to identify a first phase tracking reference signal of the plurality of phase tracking reference signals to be used in the re-transmission of the first communication.

At block 820, the first network entity retransmits the first communication in accordance with the communication metric identified based on the physical parameter to the second network entity. In some examples, the re-transmission includes the first phase tracking reference signal.

In certain aspects, one of the first communication or the re-transmission of the first communication includes a reference signal, and wherein the other of the first communication and the re-transmission of the first communication excludes a reference signal.

In certain aspects, the first communication comprises a first reference signal, wherein the re-transmission of the first communication comprises a second reference signal, and wherein the second reference signal is different from the first reference signal.

In certain aspects, the difference between the first reference signal and the second reference signal includes one or more of: a pattern of the second reference signal relative to the first reference signal, a time dimension density of the second reference signal relative to the first reference signal, or a frequency dimension density of the second reference signal relative to the first reference signal.

In certain aspects, the physical parameter of the second communication comprises one or more of a resource allocation of the second communication, or a bit field in the second communication.

In certain aspects, the communication metrics comprise one or more of: a reason for the re-transmission of the first communication, a soft decoding status of data associated with the first communication, or a recommended configuration for a re-transmission of the first communication.

In certain aspects, the reason for the re-transmission comprises one or more of a phase distortion of the first communication, or an insufficient cyclic prefix length of the first communication.

In certain aspects, the soft decoding status comprises one or more of a level of decoding based on a logarithmic likelihood ratio (LLR), or an amount of data required for decoding a block of data associated with data contained in the first communication.

In certain aspects, the recommended configuration for the re-transmission of the first communication comprises one or more of a redundancy version of the re-transmission, or a reference signal pattern for the re-transmission.

In certain aspects, the reference signal pattern of the re-transmission is different from a reference signal pattern of the first communication.

In certain aspects, operations 800 further comprise receiving, from the network entity, a message comprising a plurality of candidate reference signal patterns.

In certain aspects, a first reference signal pattern of the plurality of reference signal patterns to be used in the re-transmission of the first communication is identified based on at least one of the message from the network entity, or a predefined network rule.

In certain aspects, the message from the network entity further comprises an indication indexing the plurality of candidate reference signal patterns by the one or more communication metrics.

In certain aspects, the re-transmission includes a reference signal in accordance with the identified reference signal pattern.

In certain aspects, operations 800 further comprise receiving, from the network entity, a plurality of candidate reference signal patterns to be used in a re-transmission of the first communication, wherein the plurality of candidate reference signal patterns are indexed according to one or more communication metrics.

In certain aspects, operations 800 further comprise transmitting, to the network entity, a plurality of candidate reference signal patterns to be used in a re-transmission of a communication originating from the network entity, wherein the plurality of candidate reference signal patterns are indexed according to one or more communication metrics.

Figure 9:
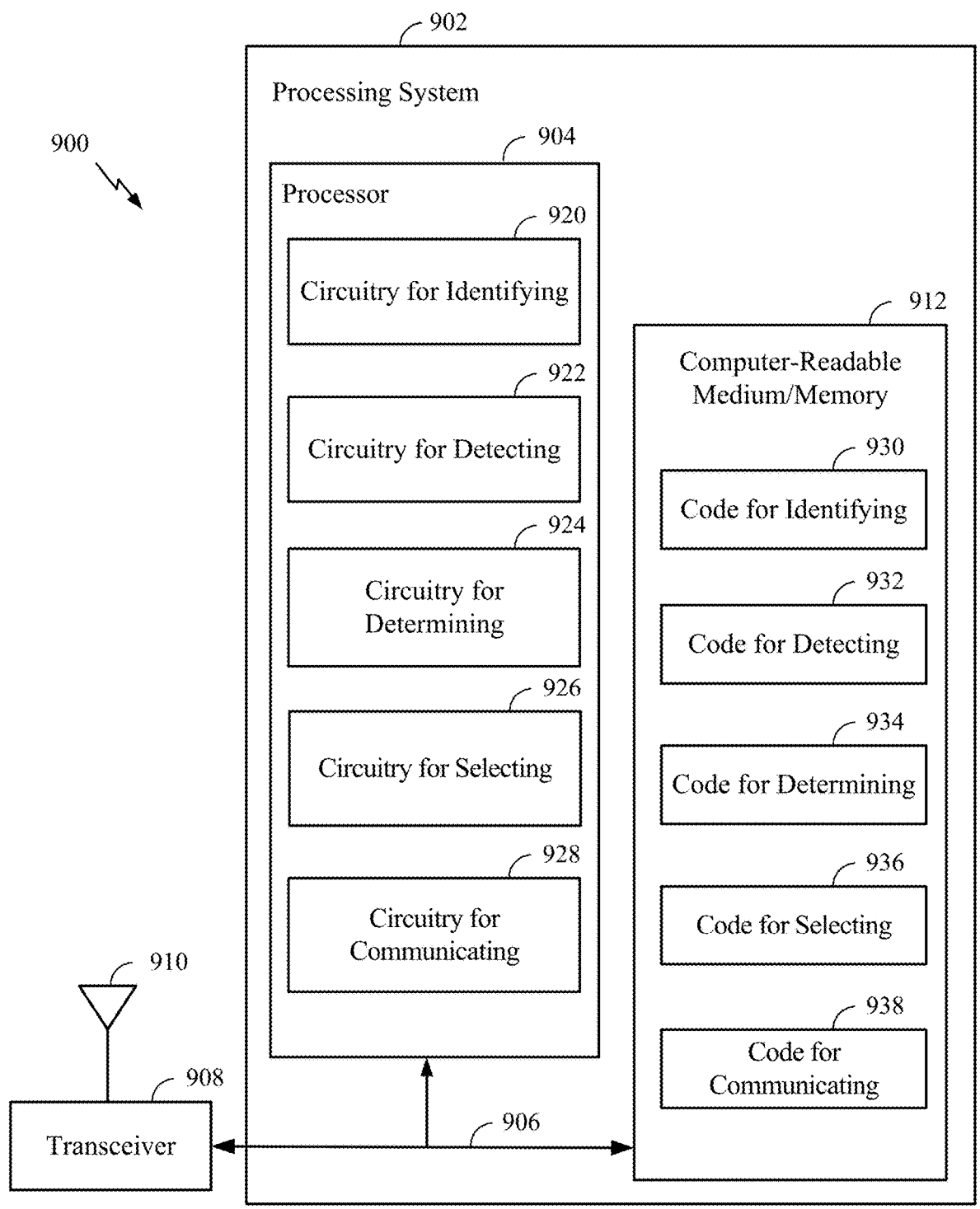
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIGS. 7 and 8. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 7 and 8, and other operations for performing the various techniques discussed herein. In certain aspects, computer-readable medium/memory 912 stores code for identifying 930, code for detecting 932, code for determining 934, code for selecting 936, and code for communicating 938. In certain aspects, the processor 904 has circuitry configured to implement the code stored in the computer-readable medium/memory 912. The processor 904 includes circuitry for identifying 920, circuitry for detecting 922, circuitry for determining 924, circuitry for selecting 926, and circuitry for communicating 928.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Additional Considerations

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 4, 7, and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising:
   detecting a failure to decode a first communication from a network entity;
   determining one or more communication metrics associated with the first communication;
   selecting a physical parameter configured to identify the one or more communication metrics associated with the first communication; and
   transmitting a second communication in accordance with the selected physical parameter to the network entity in response to detecting the failure to decode the first communication.

2. The method of claim 1, wherein the second communication is configured to request a re-transmission of the first communication according to the one or more communication metrics.

3. The method of claim 1, further comprising receiving, from the network entity, a re-transmission of the first communication in accordance with the one or more communication metrics.

4. The method of claim 3, wherein one of the first communication or the second communication includes a reference signal, and wherein the other of the first communication and the second communication excludes the reference signal.

5. The method of claim 3, wherein the first communication comprises a first reference signal, wherein the second communication comprises a second reference signal, wherein the second reference signal is different from the first reference signal, and wherein a difference between the first reference signal and the second reference signal includes one or more of:
   a pattern of the second reference signal relative to the first reference signal,
   a time dimension density of the second reference signal relative to the first reference signal, or
   a frequency dimension density of the second reference signal relative to the first reference signal.

6. The method of claim 1, wherein:
   the physical parameter of the second communication comprises one or more of:
      a resource allocation of the second communication, or
      a bit field in the second communication; and
   the one or more communication metrics comprise one or more of:
      a reason for the failure to decode the first communication,
      a soft decoding status of data associated with the first communication, or
      a recommended configuration for a re-transmission of the first communication.

7. The method of claim 1, further comprising receiving, from the network entity, a message comprising a plurality of candidate reference signal patterns.

8. The method of claim 7, wherein a first reference signal pattern of the plurality of candidate reference signal patterns to be used in a re-transmission of the first communication is identified based on at least one of the message from the network entity, or a predefined network rule; and
   wherein the method further comprises receiving, from the network entity, the re-transmission of the first communication, wherein the re-transmission includes the identified first reference signal pattern.

9. The method of claim 1, wherein the first communication comprises a downlink communication, and wherein the second communication comprises an uplink communication characterized by a hybrid automatic repeat request (HARQ) negative acknowledgment (NAK).

10. The method of claim 9, further comprising receiving a downlink control information (DCI) message from the network entity in response to the HARQ ACK, wherein the DCI message comprises one or more of:
   a schedule of a re-transmission of the downlink communication;
   a phase tracking reference signal (PTRS) pattern of the re-transmission of the first communication; or
   a density of the PTRS pattern.

11. A method for wireless communication, comprising:
   transmitting a first communication to a network entity, the first communication comprising a first reference signal;
   receiving a second communication configured to request a re-transmission of the first communication, the second communication comprising a second reference signal different from the first reference signal, wherein a difference between the first reference signal and the second reference signal includes one or more of:
      a pattern of the second reference signal relative to the first reference signal,
      a time dimension density of the second reference signal relative to the first reference signal, or
      a frequency dimension density of the second reference signal relative to the first reference signal;
   identifying one or more communication metrics associated with the first communication based on a physical parameter used to transmit the second communication; and
   re-transmitting the first communication in accordance with the one or more communication metrics identified based on the physical parameter to the network entity.

12. The method of claim 11, wherein one of the first communication or the re-transmission of the first communication includes a reference signal, and wherein the other of the first communication and the re-transmission of the first communication excludes the reference signal.

13. The method of claim 11, wherein:
   the physical parameter of the second communication comprises one or more of:
      a resource allocation of the second communication, or
      a bit field in the second communication; and
   the one or more communication metrics comprise one or more of:
      a reason for a failure to decode the first communication,
      a soft decoding status of data associated with the first communication, or
      a recommended configuration for the re-transmission of the first communication.

14. The method of claim 11, further comprising receiving, from the network entity, a message comprising a plurality of candidate reference signal patterns.

15. The method of claim 14, wherein a first reference signal pattern of the plurality of candidate reference signal patterns to be used in the re-transmission of the first communication is identified based on at least one of the message from the network entity or a predefined network rule; and
   wherein re-transmitting the first communication further comprises retransmitting the first communication with the identified first reference signal pattern.

16. An apparatus for wireless communication, comprising:
   a memory; and
   a processor communicatively coupled to the memory, wherein the processor is configured to:
      detect a failure to decode a first communication from a network entity;
      determine one or more communication metrics associated with the first communication;
      select a physical parameter configured to identify the one or more communication metrics associated with the first communication; and
      transmit a second communication in accordance with the selected physical parameter to the network entity in response to detecting the failure to decode the first communication.

17. The apparatus of claim 16, wherein the second communication is configured to request a re-transmission of the first communication according to the one or more communication metrics.

18. The apparatus of claim 16, wherein the processor is further configured to receive, from the network entity, a re-transmission of the first communication in accordance with the one or more communication metrics.

19. The apparatus of claim 18, wherein one of the first communication or the second communication includes a reference signal, and wherein the other of the first communication and the second communication excludes the reference signal.

20. The apparatus of claim 18, wherein the first communication comprises a first reference signal, wherein the second communication comprises a second reference signal, wherein the second reference signal is different from the first reference signal, and wherein a difference between the first reference signal and the second reference signal includes one or more of:
   a pattern of the second reference signal relative to the first reference signal,
   a time dimension density of the second reference signal relative to the first reference signal, or
   a frequency dimension density of the second reference signal relative to the first reference signal.

21. The apparatus of claim 16, wherein:
   the physical parameter of the second communication comprises one or more of:
      a resource allocation of the second communication, or
      a bit field in the second communication; and
   the one or more communication metrics comprise one or more of:
      a reason for the failure to decode the first communication,
      a soft decoding status of data associated with the first communication, or
      a recommended configuration for a re-transmission of the first communication.

22. The apparatus of claim 16, wherein the processor is further configured to receive, from the network entity, a message comprising a plurality of candidate reference signal patterns.

23. The apparatus of claim 22, wherein a first reference signal pattern of the plurality of candidate reference signal patterns to be used in a re-transmission of the first communication is identified based on at least one of the message from the network entity, or a predefined network rule; and
   wherein the processor is further configured to receive, from the network entity, the re-transmission of the first communication, wherein the re-transmission includes the identified first reference signal pattern.

24. The apparatus of claim 16, wherein the first communication comprises a downlink communication, and wherein the second communication comprises an uplink communication characterized by a hybrid automatic repeat request (HARQ) negative acknowledgment (NAK).

25. The apparatus of claim 24, wherein the processor is further configured to receive a downlink control information (DCI) message from the network entity in response to the HARQ ACK, wherein the DCI message comprises one or more of:
- a schedule of a re-transmission of the downlink communication;
- a phase tracking reference signal (PTRS) pattern of the re-transmission of the first communication; or
- a density of the PTRS pattern.

26. An apparatus for wireless communication, comprising:
- a memory; and
- a processor communicatively coupled to the memory, wherein the processor is configured to:
  - transmit a first communication to a network entity, the first communication comprising a first reference signal;
  - receive a second communication configured to request a re-transmission of the first communication, the second communication comprising a second reference signal different from the first reference signal, wherein a difference between the first reference signal and the second reference signal includes one or more of:
    - a pattern of the second reference signal relative to the first reference signal,
    - a time dimension density of the second reference signal relative to the first reference signal, or
    - a frequency dimension density of the second reference signal relative to the first reference signal;
  - identify one or more communication metrics associated with the first communication based on a physical parameter used to transmit the second communication; and
  - re-transmit the first communication in accordance with the one or more communication metrics identified based on the physical parameter to the network entity.

27. The apparatus of claim 26, wherein one of the first communication or the re-transmission of the first communication includes a reference signal, and wherein the other of the first communication and the re-transmission of the first communication excludes the reference signal.

* * * * *